United States Patent [19]
Yamada

[11] Patent Number: 5,694,222
[45] Date of Patent: Dec. 2, 1997

[54] IMAGE PROCESSING APPARATUS, SYSTEM, AND METHOD HAVING AN OPERATION MODE RESTRICTING CAPABILITY

[75] Inventor: Masanori Yamada, Inagi, Japan

[73] Assignee: Canon Kabushiki Kaisha, Tokyo, Japan

[21] Appl. No.: 549,116

[22] Filed: Oct. 27, 1995

[30] Foreign Application Priority Data

Oct. 31, 1994 [JP] Japan .................... 6-267056

[51] Int. Cl.⁶ .................................. H04N 1/40
[52] U.S. Cl. ........................... 358/296; 99/80
[58] Field of Search ................ 355/201, 308, 355/313, 133; 358/501, 296; 395/114, 113; 399/80, 366

[56] References Cited

U.S. PATENT DOCUMENTS

| | | | |
|---|---|---|---|
| 4,739,377 | 4/1988 | Allen | 355/133 |
| 4,739,397 | 4/1988 | Hayashi | 358/80 |
| 4,910,765 | 3/1990 | Matsuse et al. | 379/100 |
| 5,241,403 | 8/1993 | Ishikawa | 358/440 |
| 5,257,119 | 10/1993 | Funada et al. | 358/438 |
| 5,270,773 | 12/1993 | Sklut et al. | 355/201 |
| 5,481,378 | 1/1996 | Sugano et al. | 358/501 |

FOREIGN PATENT DOCUMENTS

| | | | |
|---|---|---|---|
| 0342060 | 11/1989 | European Pat. Off. | |
| 1-86164 | 3/1989 | Japan | 355/201 |
| 4-50871 | 2/1992 | Japan | 355/201 |

Primary Examiner—John H. Pendegrass
Attorney, Agent, or Firm—Fitzpatrick, Cella, Harper & Scinto

[57] ABSTRACT

An image processing apparatus having a function of restricting an operation mode is provided wherein the image processing apparatus has a unit for setting each color mode of the apparatus to be restricted, depending upon a management key, a control card, and a password number. If the unit indicates a use restriction, the restricted color mode is inhibited to be executed by the image processing apparatus.

44 Claims, 15 Drawing Sheets

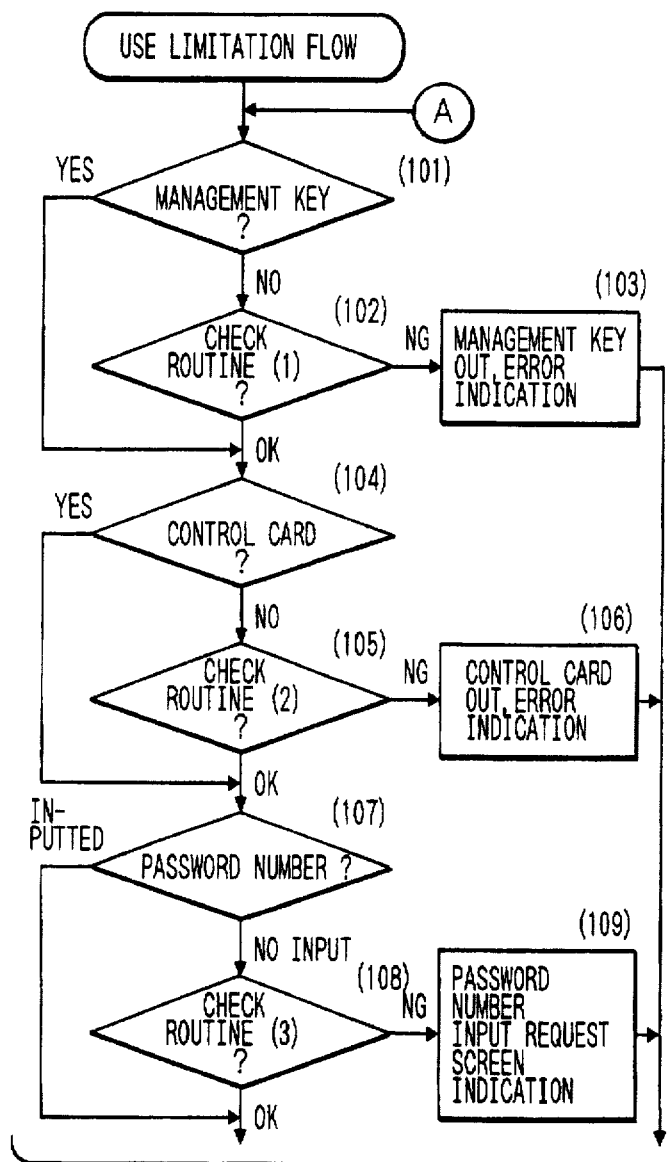
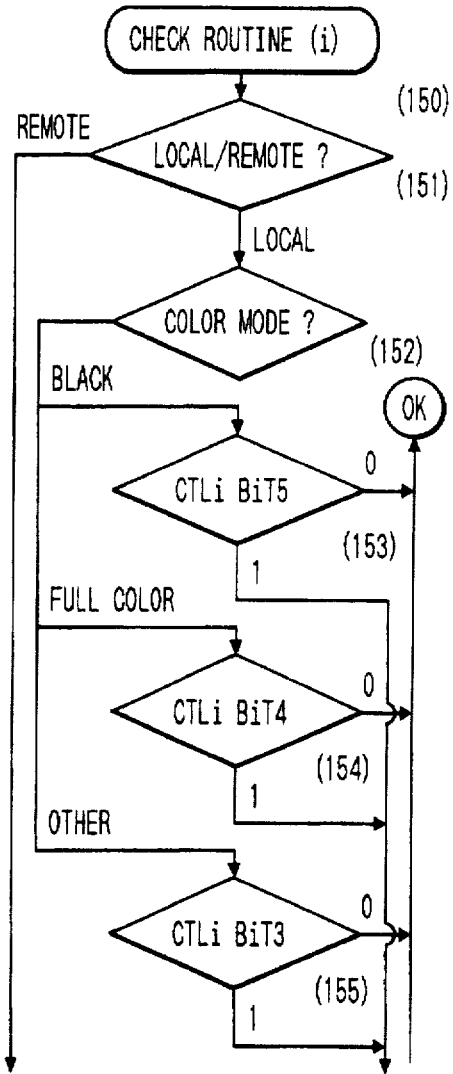

FIG. 7

(FUNCTION LIMIT SETTING)

|  | COPY | | | | PRINT | | | |
|---|---|---|---|---|---|---|---|---|
|  | BLACK | FULL COLOR | OTHER | | BLACK | FULL COLOR | OTHER | |
| MANAGEMENT KEY | × | × | × | | ○ | ○ | ○ | |
| CARD | ○ | × | × | | ○ | ○ | ○ | |
| PASSWORD NUMBER | ○ | × | ○ | | ○ | ○ | ○ | |

| COMMAND NAME | COMMAND CONTENTS | CODE (HEX) | ATTACHED PARAMETER |
|---|---|---|---|
| COM1 | PRINT START REQUEST | 80 | NONE |
| COM2 | PRINT END REQUEST | 81 | NONE |
| COM3 | PRINT NUMBER INSTRUCTION | 82 | PRINT NUMBER |
| COM4 | FEED AND DISCHARGE STAGE INSTRUCTION | 83 | PAPER FEED AND DISCHARGE STAGE |
| COM5 | COLOR MODE INSTRUCTION | 84 | COLOR MODE |
| COM6 | PASSWORD NUMBER SETTING | 85 | PASSWORD NUMBER |
| COM7 | PAPER SIZE REQUEST | 86 | NONE |
| COM8 | WHOLE STATUS REQUEST | 87 | NONE |

(1) ATTACHED PARAMETER

PRINT NUMBER  FROM bit0~bit7 TO 1~255

FEED PAPER STAGE 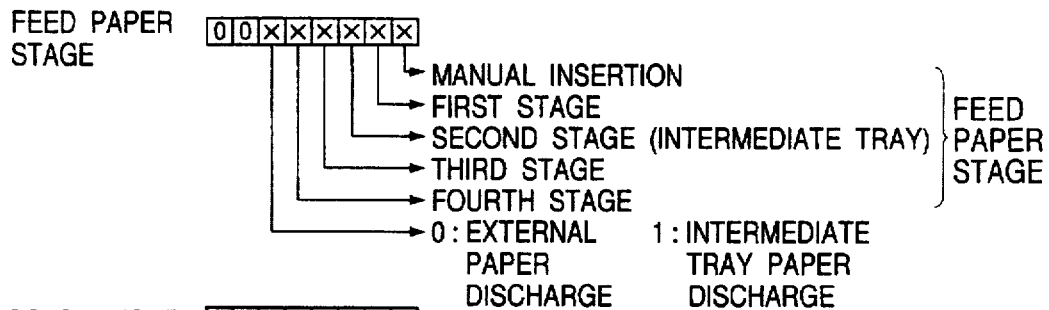
- MANUAL INSERTION
- FIRST STAGE
- SECOND STAGE (INTERMEDIATE TRAY)
- THIRD STAGE
- FOURTH STAGE
- 0 : EXTERNAL PAPER DISCHARGE    1 : INTERMEDIATE TRAY PAPER DISCHARGE

FEED PAPER STAGE

COLOR MODE 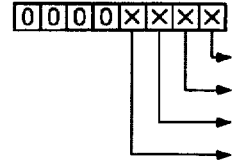
- BLACK
- MAGENTA
- CYAN
- YELLOW

PASSWORD NUMBER
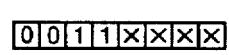 PLACE OF 1000, 30H TO 39H
 PLACE OF 100, 30H TO 39H
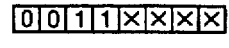 PLACE OF 10, 30H TO 39H
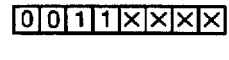 PLACE OF 1, 30H TO 39H

FIG. 9

STATUS
STS7 (PAPER SIZE)

| 0 | 0 | 0 | 0 | x | x | x | x | MANUAL INSERTION PAPER SIZE

| 0 | 0 | 0 | 0 | x | x | x | x | FIRST STAGE PAPER SIZE

| 0 | 0 | 0 | 0 | x | x | x | x | SECOND STAGE PAPER SIZE

| 0 | 0 | 0 | 0 | x | x | x | x | THIRD STAGE PAPER SIZE

| 0 | 0 | 0 | 0 | x | x | x | x | FOURTH STAGE PAPER SIZE

- 0 : A3
- 1 : B4
- 2 : A4
- 3 : B5

(0 : VERTICAL, 1 : HORIZONTAL)
(0 : PRESENCE OF PAPER, 1 : ABSENCE OF PAPER)

STS8 (WHOLE STATUS)

| 0 | x | x | x | x | x | x | x |

- 1 : WARMING UP
- 1 : OPERATING
- 1 : PASSWORD NUMBER ERROR
- 1 : CONTROL CARD ERROR
- 1 : MANAGEMENT KEY ERROR
- 1 : PAPER JAM ERROR
- 1 : OTHER ERROR

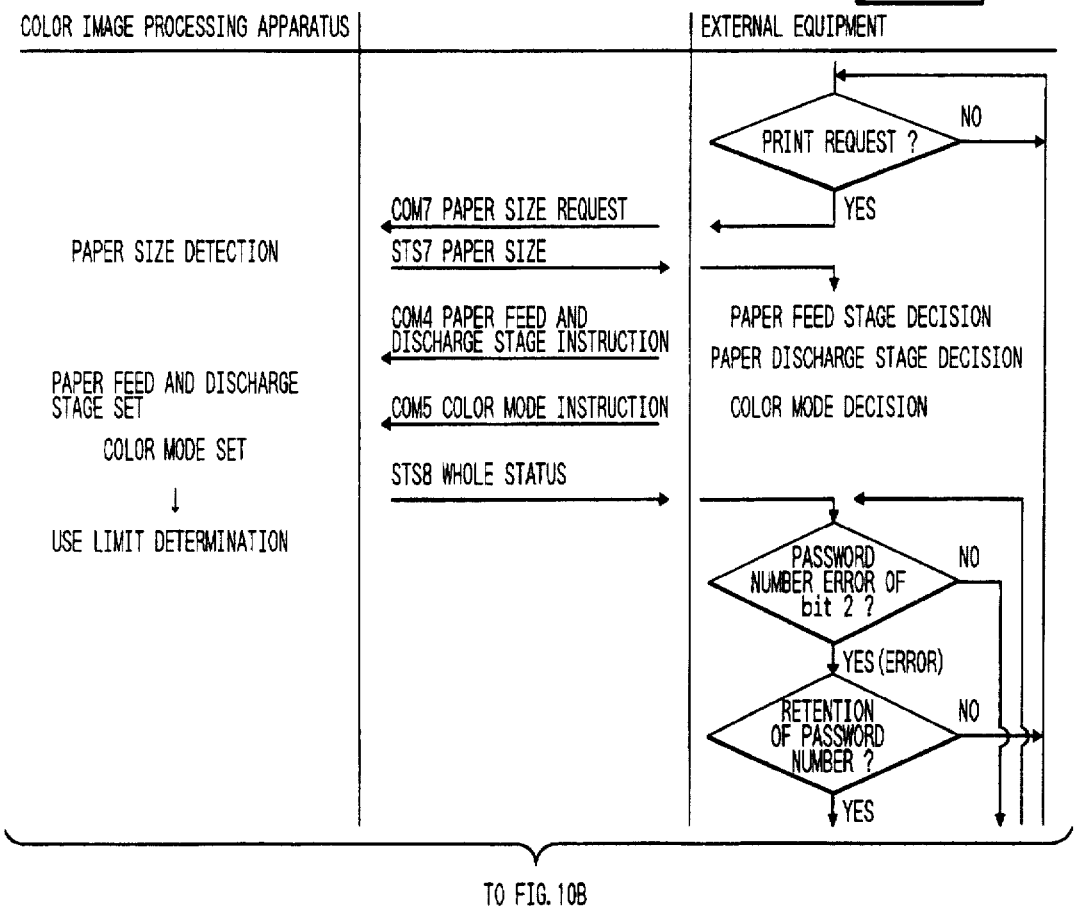

IMAGE PROCESSING APPARATUS, SYSTEM, AND METHOD HAVING AN OPERATION MODE RESTRICTING CAPABILITY

BACKGROUND OF THE INVENTION

1. Field of the Invention

The present invention relates to an image processing apparatus, an image processing system, and an image processing method.

2. Description of the Related Art

Conventionally, a manager of a color copier has been given a management key in order to prevent illicit copies of a valuable paper or the like.

A color copier is also equipped with a counter for counting the number of copies for each department in order to manage the expenditure of each department. Copying is allowed when a card assigned to each department is inserted into an adapter mounted on the color copier.

Some color copiers use a password mode instead of the department card to manage the number of copies made by each department or each user. When the user enters a password, the color copier can be used and the number of copies is counted for each password.

These use-restriction mechanisms may become inconvenient in the case of a digital copier connected to a computer, a network, or a public telephone line, if a user using the digital copier as output equipment such as a printer and a facsimile is not near the copier and, instead, is at a remote site.

SUMMARY OF THE INVENTION

It is an object of the present invention to provide an image processing apparatus, an image processing system, and an image processing method, capable of solving the above problems.

It is another object of the present invention to provide an image processing apparatus, an image processing system, and an image processing method, capable of flexibly setting the restriction of an operation mode of image processing.

In order to achieve the above objects, according to one aspect of the present invention, there is provided an image processing apparatus having a function of restricting an operation mode, comprising: first means for restricting the use of the image processing apparatus; second means for setting the operation mode of the image processing apparatus to be restricted by the first means; and control means for restricting the use of the image processing apparatus in accordance with the operation mode restricted by the first means and set by the second means if the first means is restricting the use of the image processing apparatus.

It is another object of the present invention to provide an image processing apparatus, an image processing system, and an image processing method, capable of flexibly setting an image processing mode in accordance with a variety of user requirements.

It is another object of the present invention to provide an image processing apparatus, an image processing system, and an image processing method, respectively having a novel function.

The above and other objects and features of the present invention will become manifest from the following detailed description when read in connection with the accompanying drawings.

BRIEF DESCRIPTION OF THE DRAWINGS

FIG. 7 is a diagram showing still another example of a display on the operation panel of the first embodiment.

FIG. 8 is a command table showing an example of a status report according to a second embodiment of the invention.

FIG. 9 shows examples of the status report of the second embodiment.

DETAILED DESCRIPTION OF THE PREFERRED EMBODIMENTS

Embodiments of the invention will be described in detail with reference to the accompanying diagrams.

<First Embodiment>

Figure 2:
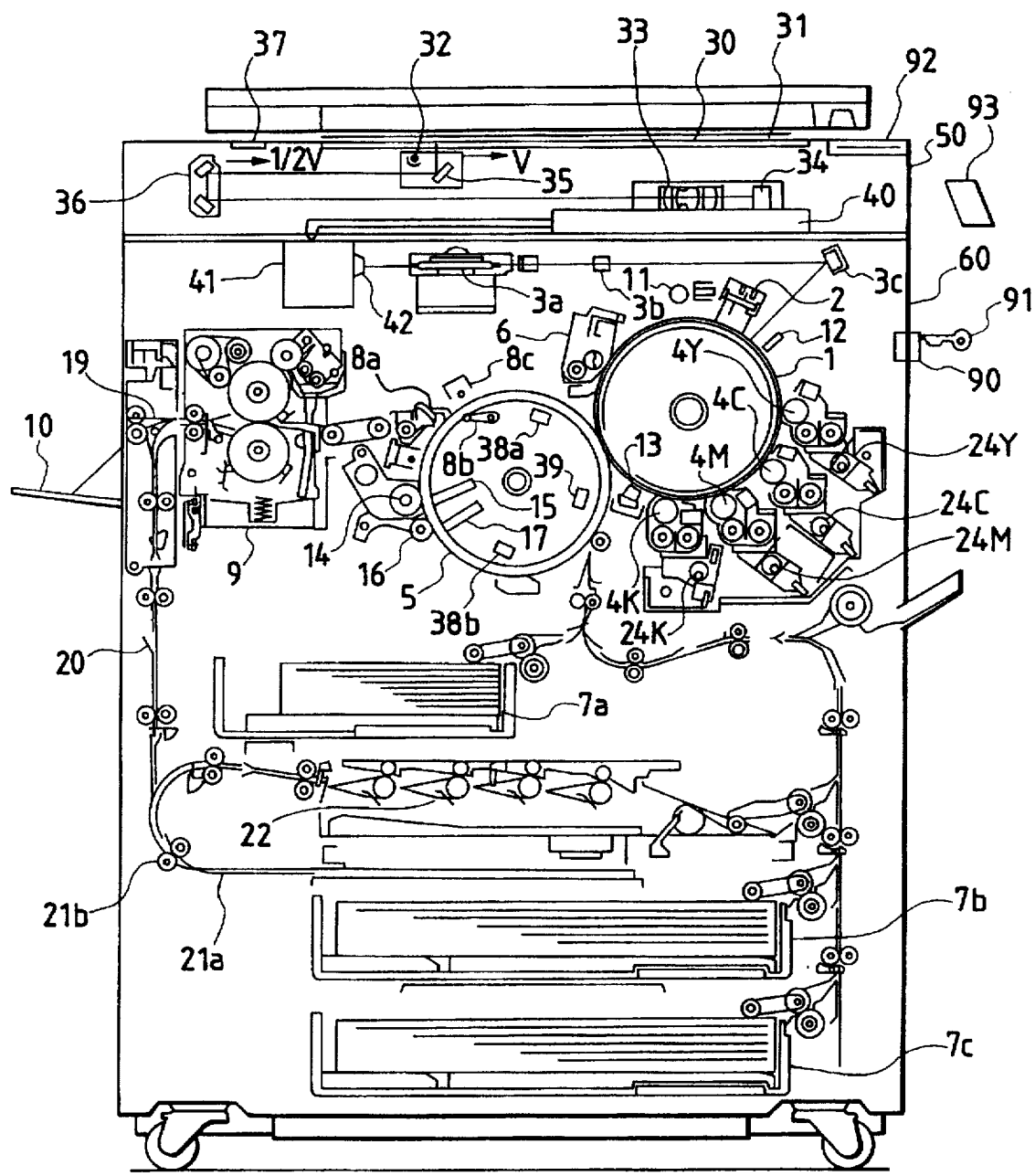
FIG. 2 is a schematic diagram showing the inside of a color image processing apparatus of the first embodiment.

FIG. 2 is a schematic diagram showing the inside of a color image processing apparatus according to the embodiment.

As shown in FIG. 2, the color image processing apparatus of this embodiment has a digital color image reader unit (hereinafter called a reader unit) 50 at its upper portion and a digital color image printer (hereinafter called a printer unit) 60 at its lower portion.

In the reader unit 50, an original 30 is placed on an original support glass 31, exposed, and scanned. An image of reflected light from the original 30 is focussed upon a full color sensor such as a CCD (hereinafter called a CCD) 34 via mirrors 35 and 36 and a lens 33 to generate color separated image signals. The color separated image signals generated by CCD 34 are amplified by an amplifier unit (not shown), processed in various ways by an image processing unit 40, and sent to the printer unit 60. Reference numeral 37 represents a standard white plate which will be later detailed.

In the printer unit 60, a photosensitive drum 1 as an image carrier is supported rotatively in the direction indicated by an arrow in FIG. 2. Mounted near the periphery of the photosensitive drum 1 are a pre-exposure lamp 11, a corona charger, laser exposure optical elements 3a, 3b, and 3c, a potential sensor 12, four different color developers 4Y, 4C, 4M, and 4K, a drum light amount detecting means 13, a transfer drum 5, and a cleaner 6.

In the laser exposure optical elements 3a, 3b, and 3c, the image signal supplied from the reader unit 50 is converted into an optical signal by a laser output unit 41. A laser beam outputted from a laser 42 is reflected by a polygon mirror 3a, and projected via the lens 3b and mirror 3c onto the surface of the photosensitive drum 1 as an optical image.

In forming an image at the printer unit 60, the photosensitive drum 1 is rotated in the direction indicated by the arrow in FIG. 2. The photosensitive drum 1 discharged by the pre-exposure lamp 11 is uniformly charged by the charger 2, and the optical image for each separated color is applied to the photosensitive drum 1 to form a latent image.

Next, the developer for the subject color is operated to develop the latent image on the photosensitive drum 1 and form a toner image essentially consisting of resin, on the photosensitive drum 1. Each developer for a particular color is selected and moved near to the photosensitive drum 1 by the operation of a corresponding one of eccentric cams 24Y, 24C, 24M, and 24K.

The toner image on the photosensitive drum 1 is transferred to a recording paper transported to the position facing the photosensitive drum 1 from one of recording paper cassettes 7a, 7b, and 7c via a transport system and the transfer drum 5. The transfer drum 5 is rotatively supported, and a recording paper carrier sheet made of dielectric material is integrally and cylindrically mounted on the peripheral opening area of the transfer drum 5. As the transfer drum 5 rotates, the toner image on the photosensitive drum 1 is transferred to the recording paper on the recording paper carrier sheet by using a charger and rollers (not shown). In this manner, a desired number of color images are transferred to form a full color image.

After four color toner images of a full color image are transferred, the recording paper is peeled off from the transfer drum 5 by means of a separation claw 8a, a separation/elevation roller 8b, and a separation charger 8c, and discharged onto a tray 10 via a thermal roller fixing unit 9.

After the image transfer, the photosensitive drum 1 is cleaned by a cleaner 6 to remove residual toner on the surface thereof, for the preparation of the next image forming process.

In forming an image on both sides of a recording paper, immediately after the recording paper passes the fixing unit 9, a transfer pass switching guide 19 is driven to temporarily guide the recording paper to a reverse path 21a via a vertical transport path 20. Thereafter, the recording paper is moved back by means of a reverse roller 21 in the reverse direction with its back end being directed toward the motion direction, and transported into an intermediate tray 22. The image is again formed on the other side of the recording paper by the above-described image forming process.

In order to prevent particles on the recording paper carrier sheet of the transfer drum 5 from being scattered or attached or to prevent oil on the recording paper from being attached, these particles and oil are removed and cleaned by a fur brush 14 and a backup brush 15 facing thereto via the recording paper carrier sheet and by an oil removal roller 16 and a backup brush 17 facing thereto via the recording paper carrier sheet. Such cleaning is performed before or after image forming, or when paper jam occurs.

Reference numeral 39 represents an image top sensor which generates an image top signal ITOP when signal plates 38a and 38b traverse the sensor 39. The plates 38a and 38b are positioned at 180 degrees so that as the transfer drum 5 rotates once, two ITOP signals are generated.

Reference numeral 90 represents a cylinder and reference numeral 91 represents a management key. As the key 91 is inserted into the cylinder 90 and turned right, a CPU to be described later detects an insertion of this key. Reference numeral 93 represents a control card optically or magnetically given a department code. Reference numeral 92 represents a card adapter which recognizes the department code when the card 93 is inserted to the adapter 92, and informs the CPU of this.

In response to a count signal from CPU to be described later, the number of copies for each department code is counted and the results are added to a count value stored in the adapter or card.

The details of the image processing unit 40 shown in FIG. 2 will be given with reference to FIG. 3.

Figure 3:
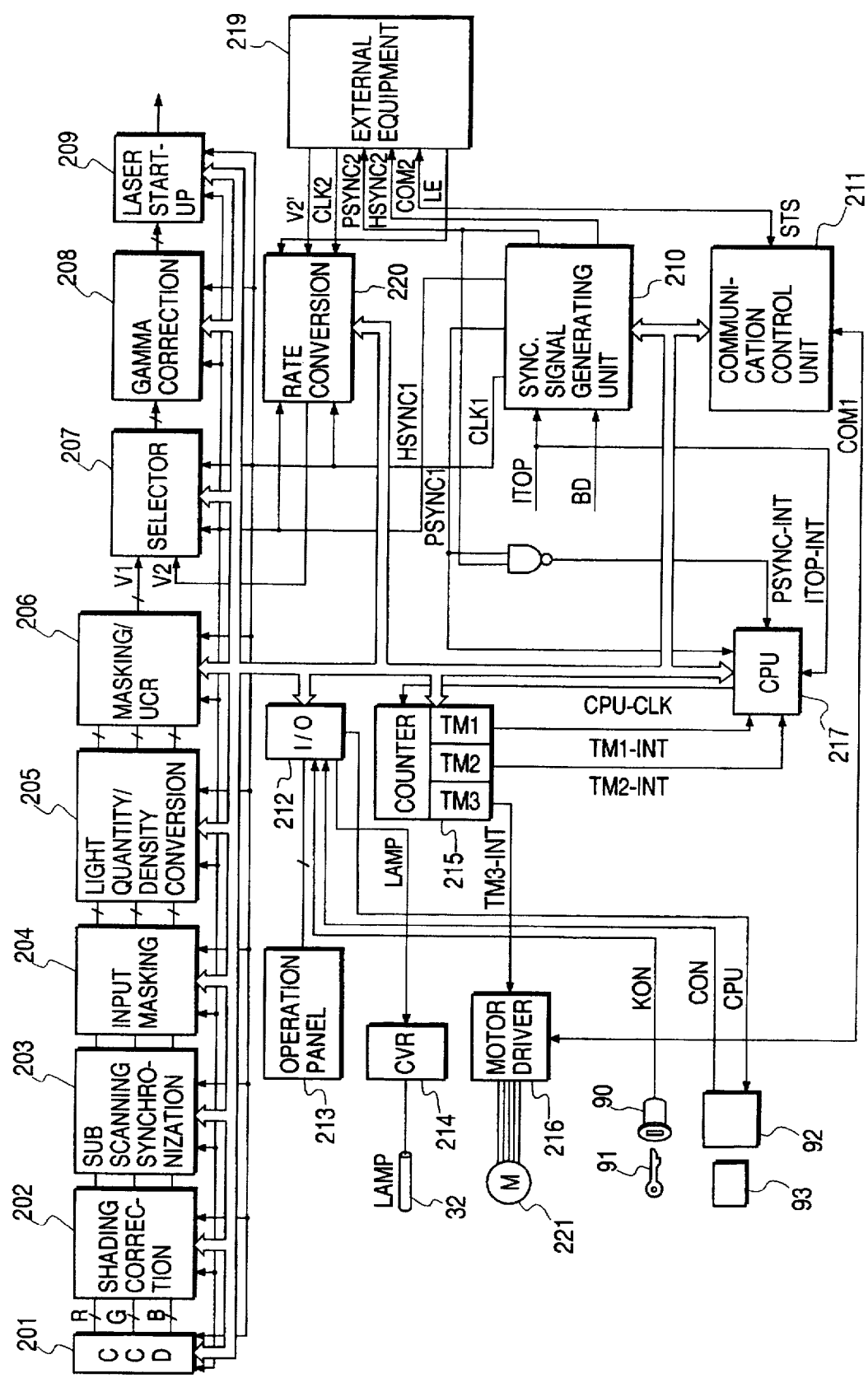
FIG. 3 is a block diagram of an image processing unit of the first embodiment.

FIG. 3 is a block diagram showing the detailed structure of the image processing unit shown in FIG. 2. An image signal photoelectrically converted by CCD 34 shown in FIG. 2 is subjected to a gain control and an offset control by a CCD processing unit 201, and thereafter converted into an 8-bit digital image signal R, G, B for each color by an A/D converter. The digital image signal for each color is then supplied to a shading correction unit 202 which performs a known shading correction by using a signal read from the standard white plate 37 shown in FIGS. 1A and 1B. Since R, G, and B light reception areas of CCD 34 are disposed spaced apart by a predetermined distance, the spacial shift in the sub-scan direction is compensated for by a sub-scanning synchronization processing unit 203 made of line delay elements.

Reference numeral 204 represents an input masking unit which corrects turbidity or the like of R, G, and B filters. Reference numeral 205 represents a light amount/density conversion unit constituted by a look-up table ROM (or RAM) which converts R, G, and B luminance signals into C, M, and Y density signals. Reference numeral 206 represents a known masking/UCR circuit. Although the detailed explanation is omitted, this circuit receives Y, M, and C three primary color signals and outputs one of Y, M, C, and Bk signals as a signal V1. This signal V1 has a predetermined bit length, e.g., 8 bits and is sequentially outputted at each read operation. Reference numeral 207 represents a selector unit for selecting an image signal to be recorded. Under the control of CPU 217, the selector unit 207 switches at a desired timing between the image signal V1 read from CCD and an image signal V2 supplied from external equipment 219 to be later described.

Reference numeral 208 represents a known gamma correction unit for recording an image of a desired density/gradation in accordance with the printer characteristics. Reference numeral 209 represents a laser driver or start-up unit for converting a digital image signal into, for example, a pulse modulated analog signal and driving a laser (not shown).

Figure 1B:
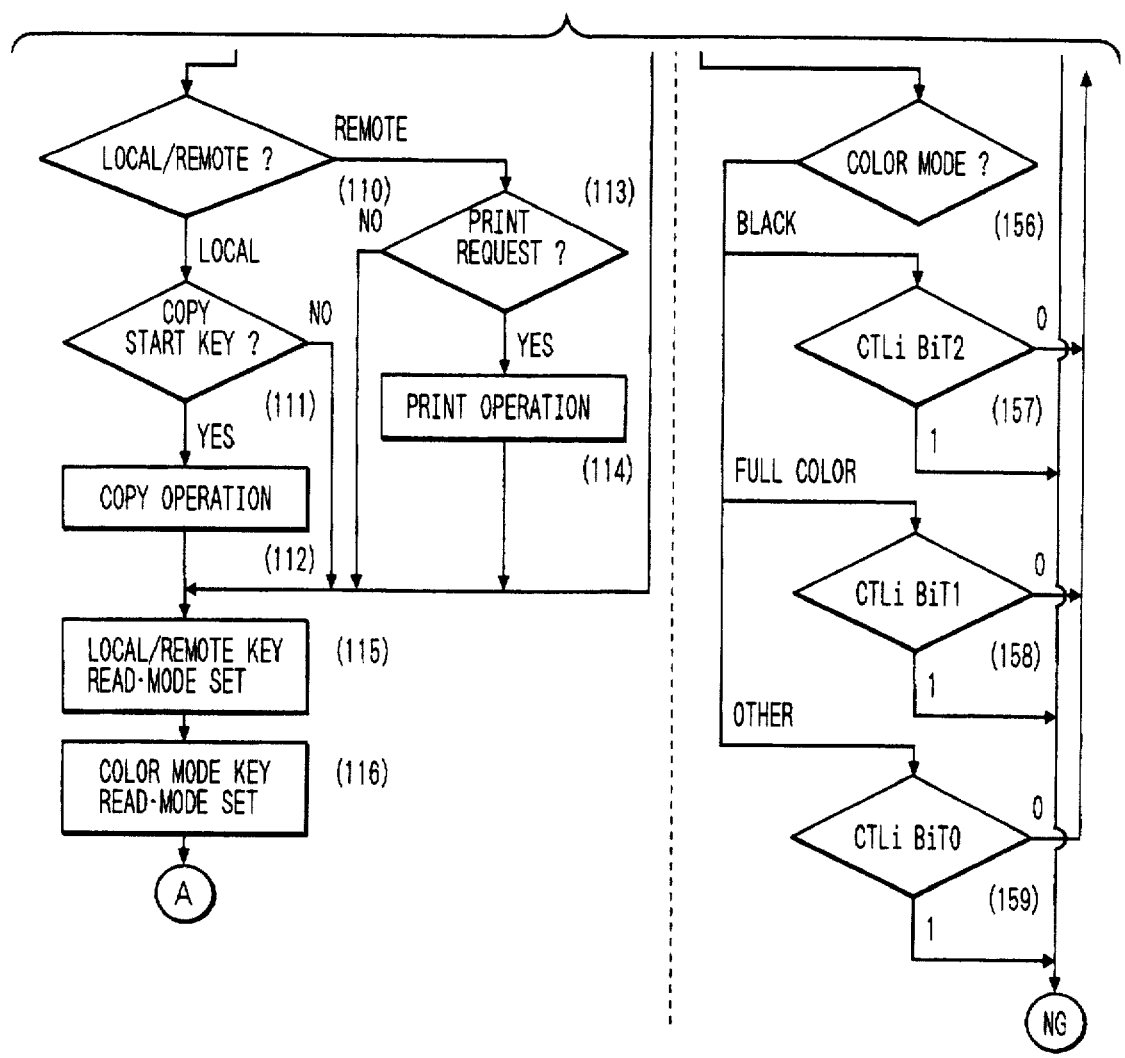
FIG. 1 is comprised of FIGS. 1A and 1B showing flow charts illustrating a use restriction judgement procedure according to a first embodiment of the invention.

Reference numeral 217 represents a CPU which controls and drives a motor 221 via a motor driver 216 for the reciprocal motion of the optical systems including the lamp 32 and mirrors 35 and 36 shown in FIGS. 1A and 1B, controls the light amount or on/off of an original illuminating lamp 32 via a constant voltage regulator 214 (CVR: lamp regulator), and controls an operation panel 213 via an I/O unit 212.

A communication control unit 211 controls communications with the motor driver 216 and external equipment 219. In this embodiment, the communication with the external equipment 219 includes a reception of a paper size, a color mode, a record start/end command for the recording of an image signal, and a transmission of the status of the reader unit 50 and printer unit 60 to the external equipment 219. Reference numeral 210 represents a sync signal generating unit which generates a pixel unit clock CLK1, line sync signals HSYNC1 and HSYNC2, and page unit sync signals PSYNC1 and PSYNC2, in accordance with the TOP signal generated synchronously with the rotation of the transfer drum 5 and a BD signal generated synchronously with the rotation of the polygon mirror. Reference numeral 220 represents a rate conversion unit which converts an image signal V2' received from the external equipment into the image signal V2. The image signal V2' is transmitted from the external equipment synchronously with the pixel clock CLK2 and a one line image effective section signal LE, and the image signal V2 is synchronous with the internal pixel clock CLK1 and line sync signal HSYNC1.

A counter unit 215 has three counters which count CPU-CLK from CPU 217 and generate interrupt signals TM1-INT, TM2-INT, and TM3-INT for the motor driver 216 and CPU 217.

A KON signal representative of an insertion of the key 91 into the cylinder 90 and a CON signal representative of an insertion of the card 93 into the card adapter 92 are supplied to the I/O unit 212 so that CPU 217 can detect the insertion of the key and card as described earlier. Each time a recording paper is fed or discharged at the printer unit, CPU 217 turns on a CPU signal for a predetermined time (e.g. 100 msec) to inform the card adapter 92 via the I/O unit of a count-up.

Figure 4:
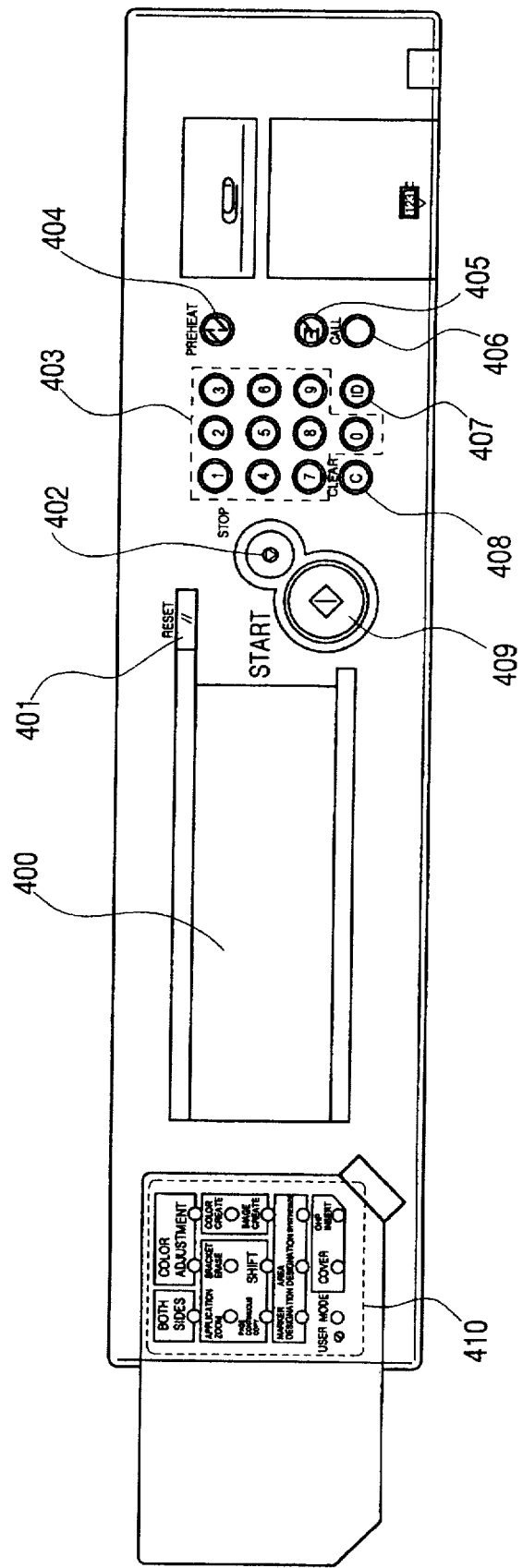
FIG. 4 is a front view of an operation panel of the first embodiment.

FIG. 4 is a front view of the operation panel which will now be described.

Reference numeral 400 represents a touch panel display unit which is used for setting and displaying a copy mode. Reference numeral 401 represents a reset key which is used for changing the copy mode to a standard mode. Reference numeral 402 represents a stop key which is used when a copy operation is stopped.

Reference numeral 403 represents a ten-key unit which is used for setting the number of copies and inputting other numerical values. Reference numeral 404 represents a pre-heat key which is used when moving to a pre-heat mode for lowering a power consumption of the apparatus and when leaving from the pre-heat mode. Reference numeral 405 represents an interrupt key which is used when a current copy operation is temporarily stopped and another copy is made. Reference numeral 406 represents a call key which is used for calling back the copy mode executed three times before or earlier. Reference numeral 408 represents a clear key for resetting the number of copies to 1. Reference numeral 409 represents a copy start key, and reference numeral 410 represents a function key for setting various functions.

Figure 5:
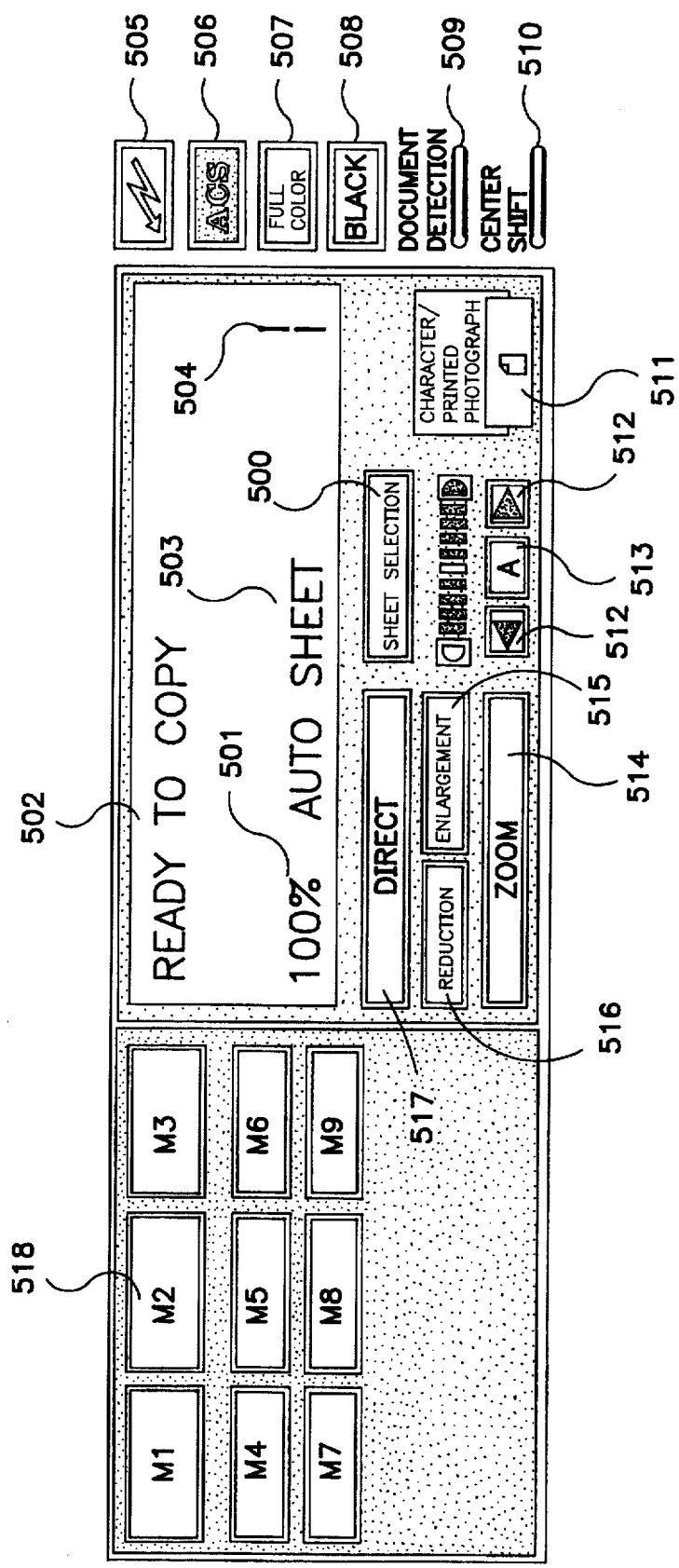
FIG. 5 is a diagram showing an example of a display on the operation panel of the first embodiment.

FIG. 5 shows an example of a display on the touch panel display unit.

Reference numeral 501 represents a magnification display which is set by using touch keys 514 to 517. Reference numeral 503 represents a paper select display which is set by using a touch key 500. Reference numeral 504 is a display of the number of copies. Reference numeral 511 represents a touch key for selecting the type of an original (character original, photograph original, character/photograph mixed original). Reference numeral 513 represents an on/off key which is used for a density automatic control, and reference numeral 512 represents a density manual control key.

Reference numeral 506 represents an automatic color select (ACS) key which is used for automatically discriminating between a monochrome original and a color original and automatically selecting either monochrome copying for a monochrome original or color copying for a color original. Reference numeral 507 represents a display of a full color copy, and reference numeral 508 represents a display of a monochrome copy. Reference numeral 509 represents an original detection key for automatically detecting the position and side of an original. Reference numeral 510 represents a center motion key used for coping an original image on the central area of a recording paper. Reference numeral 518 represents a mode memory key group for selecting a desired copy mode from nine sets of copy modes stored in advance. Reference numeral 505 represents a switching key for switching between a local copy mode and a remote print mode for outputting an image supplied from the external equipment.

FIGS. 6A to 6D show display examples of a password mode which now be described.

Figure 6A:
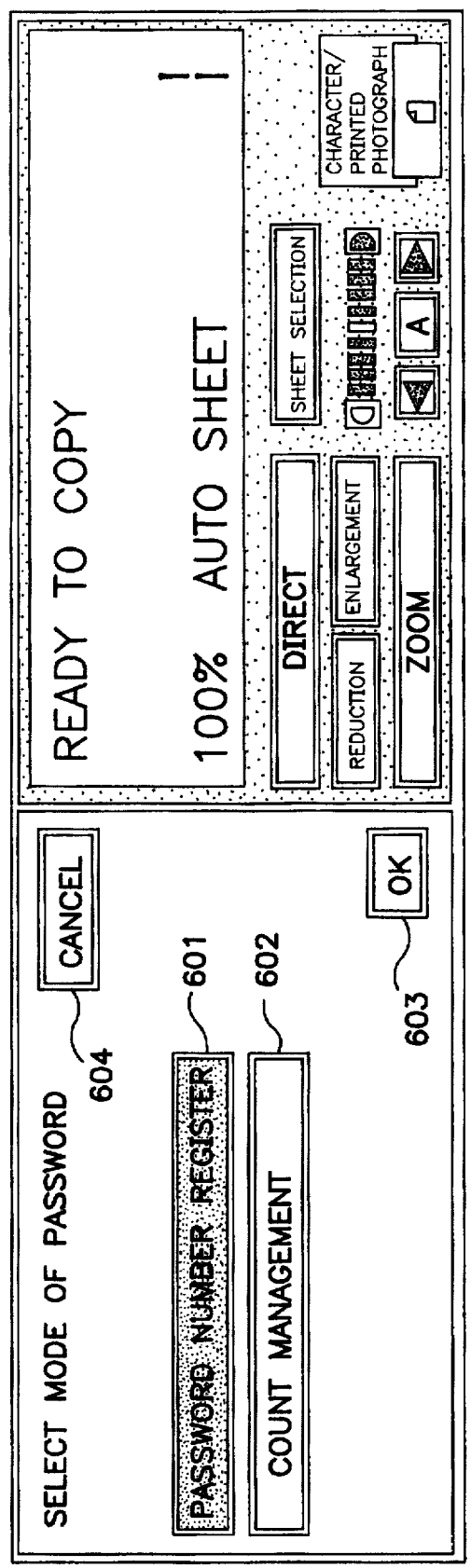
FIGS. 6A to 6D are diagrams showing other examples of a display on the operation panel of the first embodiment.

Referring to FIGS. 6A to 6D, in order to enter a password number registration mode, for example, the password key 407, stop key 402, interrupt key 405, and password key 407 are depressed in this order. Upon this depression, a display shown in FIG. 6A appears on the touch panel display unit. If a password number is to be newly registered, a "password number register" touch key 601 is depressed, and thereafter an "OK" touch key 603 is depressed. The display in FIG. 6A is then changed to the display shown in FIG. 6B.

Figure 6B:
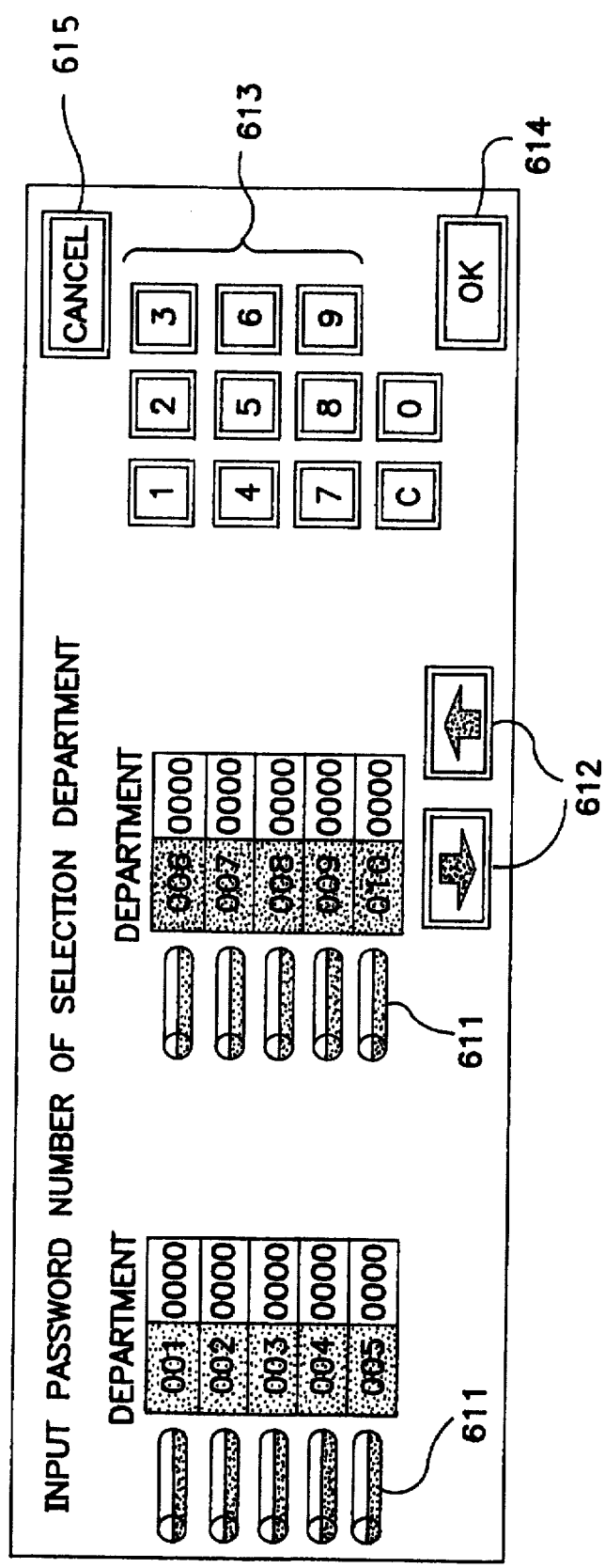
Figure 6C:
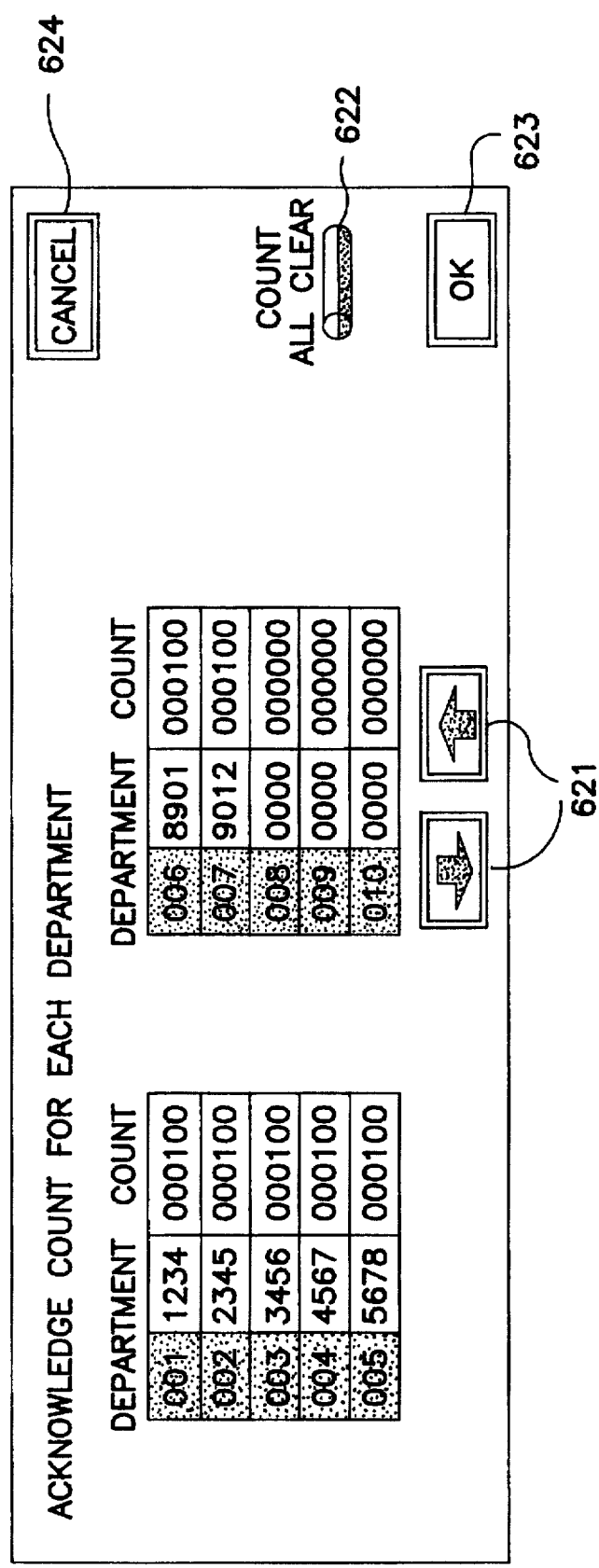

In FIG. 6B, a department code for which the pass word number has been registered is selected by using a touch key group 611. Although only department codes "001" to "010" are shown in FIG. 6B, the department codes from "001" to "100" are prepared in this embodiment. The department codes can be changed in the unit of 10 codes by a touch key 612. After the department code is selected, a desired password number is entered by using the ten-key group and clear key 613, this number being displayed on the right side of the selected department code. When the number is entered and an OK key 614 is depressed, the display changes to that shown in FIG. 6D. The registered password number is stored in a battery backed-up RAM in association with the department code. After the password number is registered, a password the same as the registered one is again entered at the display of FIG. 6D and an OK key 632 is depressed. Then, the display changes to that shown in FIG. 5 and a copy operation becomes possible.

Figure 6D:
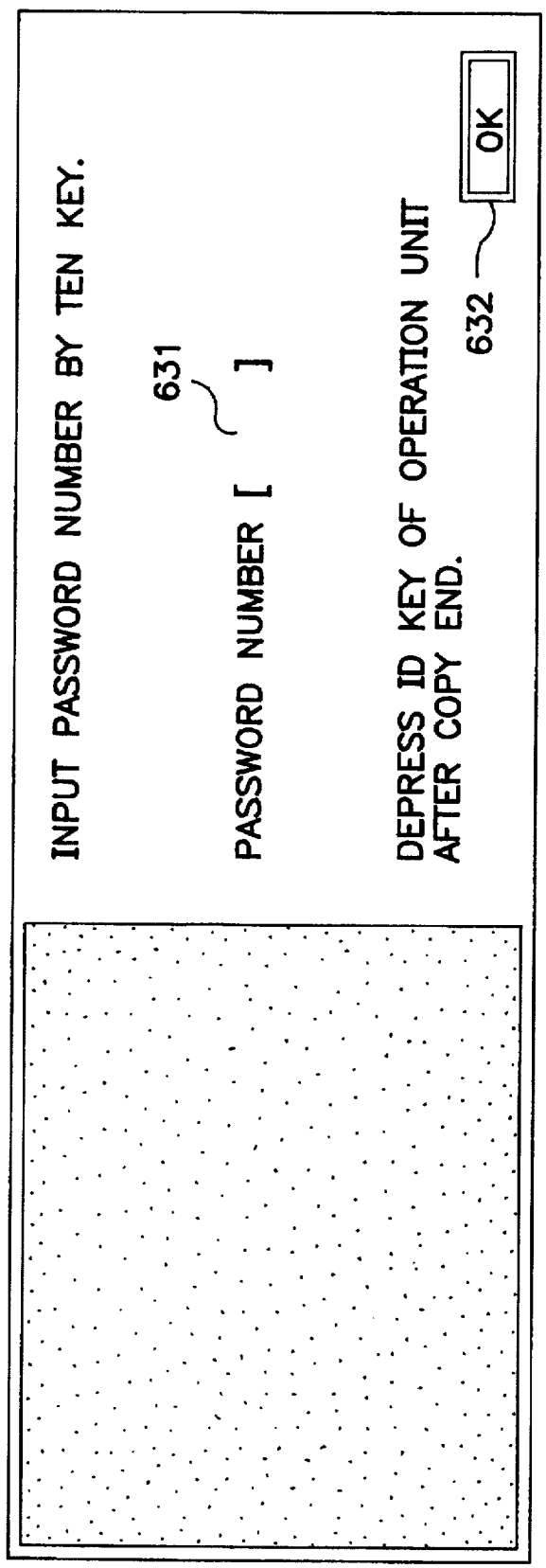

In FIG. 6D, the entered password number is displayed at an area 631. When a copy operation is performed after entering the password number, the number of copies is counted for each department code, and accumulated in the battery backed-up RAM. In FIG. 6A, when a "count management" touch key 602 is depressed and then the OK key 603 is depressed, the display changes to that shown in FIG. 6C and the stored count value in association with the department code is displayed.

The password number is also displayed between the department code and the count value.

Similarly to FIG. 6B, the department codes can be changed in the unit of 10 codes by a key 621. When the password key 407 is depressed after the copy operation, the display returns to that shown in FIG. 6D, to wait for an enter of the password number again. Instead of the battery backed-up RAM, other non-volatile memories such as an EEPROM may also be used.

FIG. 7 shows examples of use restriction or limit setting for the apparatus of this embodiment. The display shown in FIG. 7 is a dedicated display prepared for a service technical person or a key operator. By using this display, the conditions of allowing a user to use the apparatus in a particular case are set, even if the management key, control card, or password number indicates some use restriction (either the management key or the control card, or both are not inserted, or the registered password number is not entered).

The procedure to obtain this display is not directly relevant to this embodiment, and so the description thereof is omitted. In the example shown in FIG. 7, a circle-in-square key ◎ indicates that printing by the external equipment is allowed even if the management key and card are not inserted and the password number is not entered. A cross-in-square key ⊠ indicates that the local copy operation is inhibited if the management key is not inserted, irrespective of the color mode. Even if the card is not entered, a monochrome copy is permitted. If the management key is inserted, the monochrome copy is permitted and a single color copy other than black (e.g., magenta, cyan, yellow, red, blue, green, etc.) is permitted even if the password number is entered. The full color copy is permitted only if all the use restriction means (key, card, and password number) are satisfied. The cross-in-square and circle-in-square keys are a touch key and the cross and circle are interchanged each time the key is depressed.

The settings for the management key, card, and password number are stored in flags CTL1, CTL2, and CTL3 of the battery backed-up RAM. For example, the setting for restricting the function of the management key is CTL1= 00111000B (B means binary). Bits 0 to 5 correspond to the other color mode, full color mode, and black mode respectively for remote printing, and the other color mode, full color mode, and black mode respectively for local copying. Bits 6 and 7 correspond to "don't care". Similarly, the setting for the control card shown in FIG. 7 is CTL2=00011000B, and the setting for the password number is CTL3= 00010000B.

The procedure of controlling the apparatus use restriction of this embodiment is illustrated in FIGS. 1A and 1B. The description of this procedure will now be give.

It is first checked whether a management key is set (Step 101). If not, the contents of restriction setting of the management key are checked by a check routine (1) (Step 102).

The details of the check routine are illustrated from Step 150 and following Steps.

In the check routine, it is first judged whether the present setting is a local copy mode or a remote print mode (Step 151). In the case of the local copy mode, it is checked whether the bit 5, 4, or 3 of the flag CTL1 in RAM is "0" or "1" for each color mode (black, full color, other colors) (Steps 153, 154, and 155). If the bit is "0", the use restriction means indicates a use permission state. Therefore, even if the management key is not set, a color mode copy corresponding to each bit is permitted. If the bit is "1", the use is inhibited. Similarly, in the case of the remote print mode, the bits 2, 1, and 0 of the flag CTL1 are checked for the respective color modes.

If the check routine determines a use inhibition (NG) (Step 102), a display to effect that the apparatus cannot be used because the management key is not inserted, is displayed on the touch panel display unit 400 (Step 103). If the management key is set (Step 101) or the check routine determines a user permission (OK) (Step 102), it is checked whether the control card is set (Step 104). If the control card is not set, the check routine (i) is set to i=2 and executed. The contents of the flag CTL2 corresponding to the function restriction contents set for the control card are checked (Step 105). In the case of the use inhibition (NG), a display in effect that the apparatus cannot be used because the control card is not set, is displayed on the touch panel display unit 400 (Step 106).

If the control card is set (Step 104) or if the check routine determines a use permission (OK) (Step 105), it is checked whether the correct password number is entered (Step 107). Similar to the above, the function restriction contents for the password are checked by the check routine (i=3) (Step 108). If NG, a password number input display is displayed on the touch panel display unit 400 (Step 109). If the correct password number is entered (Step 107) or the check routine (3) determines a use permission (OK) (Step 108), an input of the copy start key is awaited in the case of the local copy mode (Steps 110 and 111), whereas in the remote print mode, a print request command from the external equipment is awaited (Steps 110 and 113). If the key input or the command is received, the copy or print operation starts (Steps 112 and 114).

Thereafter, a local/remote switching key is read and the mode is set (Step 115), a color mode select key for full color, black, and other color modes is read and the mode is set (Step 116), and other copy modes are set although not shown in FIGS. 1A and 1B, to thereby return to Step 101 and repeat the above procedure.

As described above, the use restriction means (management key, control card, and password number) and the means for setting the use restriction function for each of the use restriction means are provided. Whether the apparatus can be used or not is judged from the presently set use restriction function in accordance with the status of the use restriction means. Accordingly, for example, only a local copy can be restricted without restricting a remote print, or a local copy can be restricted depending upon its color mode.

Such a use restriction may be selectively controlled in accordance with the user intention.

Although three user restriction means including "management key", "control card", and "password number" are used, the number of user restriction means is not limited only to three but any other numbers inclusive of one may be used.

It is obvious that the restriction function is not limited only to the color mode, local copy mode, and remote print mode.

In FIG. 6D showing a password number input request display, the keys 505, 506, 507, and 508 are displayed (although not depicted in FIG. 6D) on the right side of the display shown in FIG. 6D. With this display, even if the use inhibition state is active with the full color mode being selected, if the black mode is selected by the key 508, the display is changed to that shown in FIG. 5 and the copy operation is permitted without entering the password number.

In the above embodiment, a color copier is used. Obviously, this embodiment is also applicable to a copy operation by a color facsimile, to an output to a color monitor, and to other equipment.

<Second Embodiment>

In the first embodiment, three use restriction means can be used only if a user is near the color image processing apparatus. In view of this, means for making these use restriction means invalid for permitting the execution of a remote print is provided so that a remote user can use the apparatus without the use restriction means. In this case, however, the department of a user requesting a remote print cannot be identified and the number of remote print copies for each department cannot be managed. In order to solve this disadvantage, means for entering a password number from external equipment is provided in the second embodiment so that management for each department and use restriction for each function can be realized even for a remote print.

FIGS. 8 and 9 show examples of commands and status reports used in a serial communication protocol to be performed between a color image processing apparatus and an external equipment, according to the second embodiment of the invention.

A command is transmitted from the external equipment to the color image processing apparatus, via the communication control unit 211, judged and processed by CPU 217. In response to the command transmitted from the external equipment, a status report is returned back from CPU 217 to the external equipment via the communication control unit 211.

FIG. 8 is a command table. Each command is constituted by one byte. Some commands each have parameters of 1 to 5 bytes attached thereto.

A print start request command COM1 is used when the external equipment requests a print start to the image processing apparatus. A print end request command COM2 is used when the print operation is temporarily stopped. A print number instruction command COM3 instructs the number of copies to be printed. A feed/discharge stage is instructed by a feed/discharge stage instruction command COM4. The image processing apparatus has an automatic both-side recording mechanism, and the second feed/discharge stage is used both as the feed stage and discharge stage because it is used as an intermediate tray.

A color mode instruction command COM5 selects a developer to be used for a designated print color mode. A password number setting command COM 6 sets a password number by a four-digit ASCII code to be entered in the password mode described with the first embodiment. It is obvious that instead of an ASCII code, a HEX code or BCD code may also be used. By using a paper size request command COM7, an inquiry regarding the sizes of the recording paper set at the image processing apparatus is made. Upon reception of COM7, the image processing apparatus returns back a status report STS7 shown in FIG. 9. An inquiry regarding the whole status of the image processing apparatus is made by using a whole status request command COM8. Upon reception of COM8, the image processing apparatus returns back a status report STS8 shown in FIG. 9.

In response to COM1 to COM6, the status report STS8 is returned back.

Figure 10B:
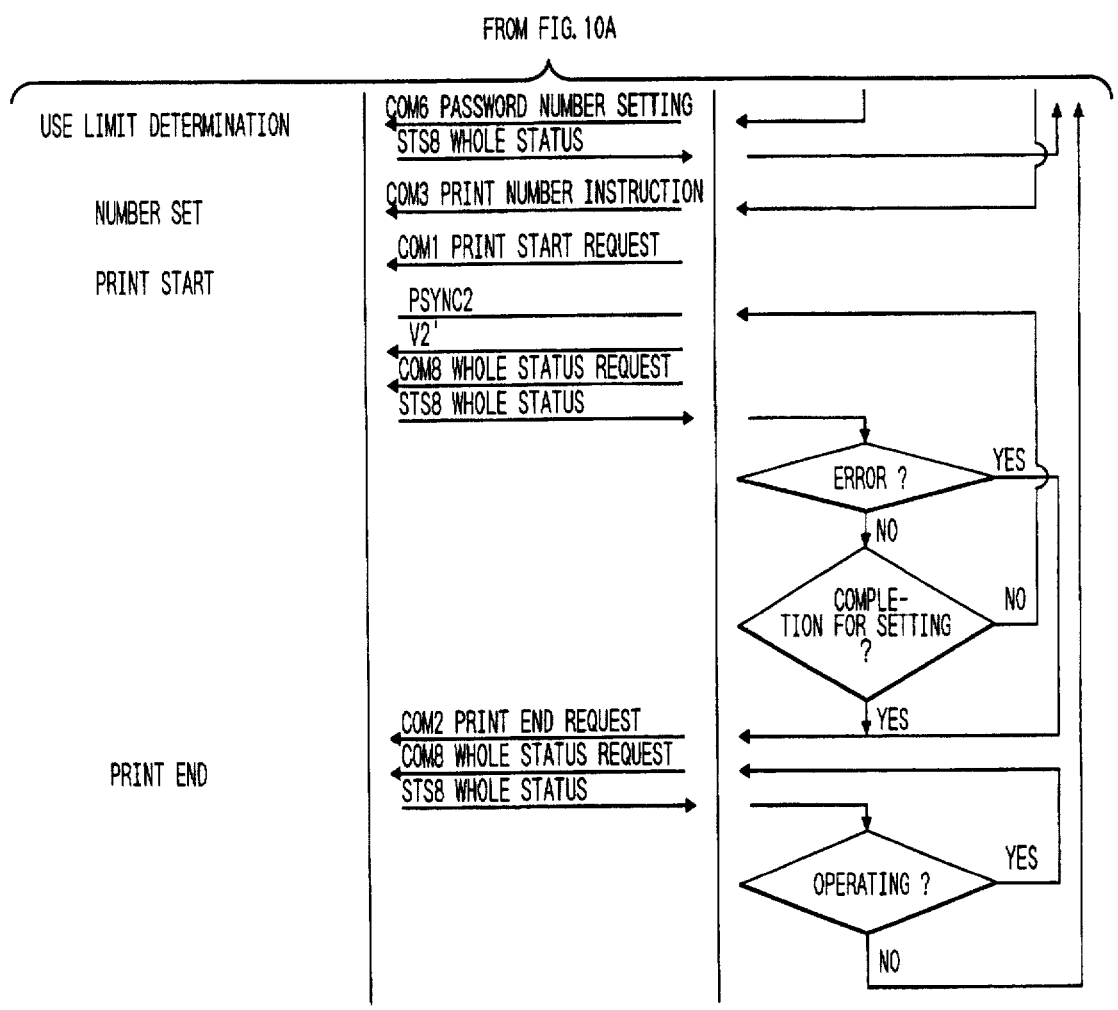
FIG. 10 is comprised of FIGS. 10A and 10B showing examples of a protocol used by the second embodiment.

FIGS. 10A and 10B illustrate examples of a protocol to be performed between the color image processing apparatus and the external equipment. When the external equipment requests a remote print, an inquiry regarding the paper sizes is made by using COM7 to determine a feed stage and discharge stage having a desired paper size. Then, the determined feed/discharge stages are informed by using COM4. A desired color mode is instructed by using COM5.

Upon reception of the instructed color mode, the image processing apparatus determines either a use permission or a use inhibition in accordance with the use restriction judgement procedure illustrated in FIGS. 1A and 1B, and the results are informed to the external equipment by using the second bit 2 of STS8.

If the external equipment enters an incorrect password number of its own and retains the password, the correct password number is reentered by using COM6. The password number may be assigned to the external equipment itself, or to the user requesting a remote print at the external equipment. The image processing apparatus receiving this password number again executes the use restriction judgement procedure. If the correct password number is entered, the second bit 2 of STS8 is set to "0" and the error is removed. Therefore, the external equipment instructs the number of copies to be printed by using COM3 and requests printing by using COM1.

Thereafter, the image signal V2' supplied from the external equipment is printed out for a preset number of colors and a preset number of copies to be printed, synchronously with the vertical sync signal PSYNC2 of the image processing apparatus. In this manner, the print operation is completed.

Since the password number can be entered from the external equipment, the function use restriction can be set even for the remote print operation so that the usability of the image processing apparatus as a printer can be improved and the number of copies by a remote print can be managed while preventing illicit use of the image processing apparatus.

It is apparent that the external equipment may be any input device such as a video camera, a still video camera, a digital video camera, a computer, and an image file.

As described above, the image processing apparatus of the first embodiment has a function of restricting an operation mode. The image processing apparatus has a first means for restricting the use of the apparatus, a second means for setting the operation mode of the image processing apparatus to be restricted by the first means, and a control means for restricting the use of the image processing apparatus in accordance with the operation mode restricted by the first means and set by the second means if the first means is restricting the use of the image processing apparatus. Accordingly, the operation mode of the image processing apparatus can be restricted as desired in accordance with the first means.

Although the image processing apparatus of the first and second embodiments uses a color copier, the invention is not limited only to the color copier, but various applications are possible without departing from the scope of the appended claims.

What is claimed is:

1. An image processing apparatus having a function of restricting an operation mode, said image processing apparatus comprising:

input means capable of inputting images from a plurality of external apparatuses;

first means for restricting a use of said image processing apparatus;

second means for setting an operation mode of said image processing apparatus in accordance with the use restricted by said first means; and control means for controlling said image processing apparatus in accordance with the operation mode set by said second means when said first means restricts the use of said image processing apparatus, wherein said second means is capable of setting the operation mode for each of the plurality of external apparatuses.

2. An image processing apparatus according to claim 1, wherein said first means restricts the use of said image processing apparatus in response to a presence or absence of a predetermined command inputted from said plurality of external apparatuses.

3. An image processing apparatus according to claim 2, wherein the predetermined command is a password number.

4. An image processing apparatus according to claim 2, wherein said predetermined command is entered from said plurality of external apparatuses prior to an input of an image signal from said plurality of external apparatuses.

5. An image processing system having a function of restricting an operation mode, said image processing system comprising:
   input means capable of inputting images from a plurality of external apparatuses;
   first means for restricting a use of said image processing system;
   second means for setting an operation mode of said image processing system in accordance with the use restricted by said first means; and
   control means for controlling said image processing system in accordance with the operation mode set by said second means when said first means restricts the use of said image processing system,
   wherein said second means is capable of setting the operation mode for each of the plurality of external apparatuses.

6. An image processing system according to claim 5, wherein said first means restricts the use of said image processing system in response to a presence or absence of a predetermined command inputted from said plurality of external apparatuses.

7. An image processing system according to claim 6, wherein the predetermined command is a password number.

8. An image processing system according to claim 6, wherein said predetermined command is entered from said plurality of external apparatuses prior to an input of an image signal from said plurality of external apparatuses.

9. An image processing method for an image processing apparatus or system having a function of restricting an operation mode, said image processing method comprising the steps of:
   inputting images from a plurality of external apparatuses;
   restricting a use of said image processing method;
   setting an operation mode of said image processing method in accordance with the use restricted in said restricting step; and
   controlling said image processing method in accordance with the operation mode set in said setting step when the use of said image processing method is being restricted in said restricting step,
   wherein said setting step is capable of setting the operation mode for each of the plurality of external apparatuses.

10. An image processing method according to claim 9, wherein at least one of the plurality of image input means is connected to an external equipment, and said use restriction restricts the use of said image processing method in response to a presence or absence of a predetermined command inputted from the plurality of external apparatuses.

11. An image processing method according to claim 10, wherein the predetermined command is a password number.

12. An image processing method according to claim 10, wherein said predetermined command is entered from said plurality of external apparatuses prior to an input of an image signal from said plurality of external apparatuses.

13. An image processing apparatus comprising:
   data generating means for generating image data;
   image processing means having a first processing mode for processing image data received from an external apparatus and a second processing mode for processing image data generated by said data generating means; and
   setting means for independently setting a restriction of the processing in the first processing mode and a restriction of the processing in the second processing mode.

14. An image processing apparatus according to claim 13, wherein a process restricted by said setting means includes at least one of color image formation and monochrome image formation.

15. An image processing apparatus according to claim 13, wherein said setting means is an operation panel.

16. An image processing apparatus according to claim 13, wherein the restriction of the processing in the first processing mode is activated in accordance with an authentication of the external apparatus.

17. An image processing apparatus according to claim 13, wherein the restriction of the processing in the first processing mode is activated in accordance with an authentication of an operator who conducts processing using the second processing mode.

18. An image processing apparatus according to claim 17, wherein an authentication of the operator is performed in accordance with a presence or absence of a use of a management key or a control key, or presence or absence of an input of a password number.

19. An image processing apparatus according to claim 13, wherein said image processing apparatus is a copying machine.

20. An image processing method comprising the steps of:
   generating image data;
   processing in a first processing mode image data received from an external apparatus and processing in a second processing mode image data generated in said generating image data step; and
   independently setting a restriction of the processing in the first processing mode and a restriction of the processing in the second processing mode.

21. An image processing method according to claim 20, wherein a process restricted in said setting step includes at least one of color image formation and monochrome image formation.

22. An image processing method according to claim 20, wherein said setting step includes operation of an operation panel.

23. An image processing method according to claim 20, wherein the restriction of the processing in the first processing mode is activated in accordance with an authentication of the external apparatus.

24. An image processing method according to claim 20, wherein the restriction of the processing in the first processing mode is activated in accordance with an authentication of an operator who conducts processing using the second processing mode.

25. An image processing method according to claim 24, wherein an authentication of the operator is performed in accordance with a presence or absence of a use of a management key or a control key, or presence or absence of an input of a password number.

26. An image processing method according to claim 20, wherein said image processing method is for a copying machine.

27. An image processing apparatus comprising:
   plural restricting means for restricting a plurality of forms of use of said image processing apparatus, with the forms of use being different from each other;
   setting means for setting a restriction of an operation mode of said image processing apparatus for each of said plural restricting means; and
   control means for controlling said image processing apparatus in accordance with the restriction of the operation mode which is set by said setting means and which is set for a restricting means in use among said plural restricting means.

28. An image processing apparatus according to claim 27, wherein the operation mode is a color mode.

29. An image processing apparatus according to claim 28, wherein the color mode includes a full color mode, a single color mode, and a monochrome mode.

30. An image processing apparatus according to claim 27, wherein said setting means includes an operation panel, and the restriction of the operation mode is set in accordance with an instruction, which is entered using said operation panel.

31. An image processing apparatus according to claim 27, wherein said control means allows an operation mode other than the operation mode restricted by said setting means to be executable.

32. An image processing apparatus according to claim 27, wherein said plural restricting means include at least two of a management key, a control card, and a password number.

33. An image processing system comprising:
   plural restricting means for restricting a plurality of forms of use of said image processing system, with the forms of use being different from each other;
   setting means for setting a restriction of an operation mode of said image processing system for each of said plural restricting means; and
   control means for controlling said image processing system in accordance with the restriction of the operation mode which is set by said setting means and which is set for a restricting means in use among said plural restricting means.

34. An image processing system according to claim 33, wherein the operation mode is a color mode.

35. An image processing system according to claim 34, wherein the color mode includes a full color mode, a single color mode, and a monochrome mode.

36. An image processing system according to claim 33, wherein said setting means includes an operation panel, and the restriction of the operation mode is set in accordance with an instruction, which is entered using said operation panel.

37. An image processing system according to claim 33, wherein said control means allows an operation mode other than the operation mode restricted by said setting means to be executable.

38. An image processing system according to claim 33, wherein said plural restricting means include at least two of a management key, a control card, and a password number.

39. An image processing method comprising the steps of:
   restricting with plural restricting means a plurality of forms of use of said image processing method, with the forms of use being different from each other;
   setting a restriction of an operation mode of said image processing method for each of the plural restricting means; and
   controlling said image processing method in accordance with the restriction of the operation mode which is set in said setting step and which is set for a restricting means in use among the plural restricting means.

40. An image processing method according to claim 39, wherein the operation mode is a color mode.

41. An image processing method according to claim 40, wherein the color mode includes a full color mode, a single color mode, and a monochrome mode.

42. An image processing method according to claim 39, wherein said setting step sets the restriction of the operation mode in accordance with an instruction, which is entered using an operation panel.

43. An image processing method according to claim 39, wherein said controlling step allows an operation mode other than the operation mode restricted by said setting step to be executable.

44. An image processing method according to claim 39, wherein the plural restricting means include at least two of a management key, a control card, and a password number.

* * * * *

UNITED STATES PATENT AND TRADEMARK OFFICE
CERTIFICATE OF CORRECTION

PATENT NO. : 5,694,222     Page 1 of 2
DATED : December 2, 1997
INVENTOR(S) : Masanori Yamada It is certified that error appears in the above-identified patent and that said Letters Patent is hereby corrected as shown below:

COLUMN 2

Line 43, delete "(hereinafter called a CCD)".

COLUMN 3

Line 8, "to" should be deleted.
    Line 13, "of" should read --of the--.

COLUMN 4

Line 1, "from" should read --from the--.

COLUMN 6

Line 1, "coping" should read --copying--.
    Line 52, "enter" should read --entering--.

COLUMN 7

Line 31, "give." should read --given.--.

UNITED STATES PATENT AND TRADEMARK OFFICE
CERTIFICATE OF CORRECTION

PATENT NO. : 5,694,222
DATED : December 2, 1997
INVENTOR(S) : Masanori Yamada

It is certified that error appears in the above-identified patent and that said Letters Patent is hereby corrected as shown below:

COLUMN 9

Line 2, "an" should be deleted.
    Line 6, "by" should read --by the--.
    Line 8, "from" should read --from the--.

COLUMN 11

Line 48, "an" should be deleted.

Signed and Sealed this

Fourth Day of August, 1998

Attest:

BRUCE LEHMAN

*Attesting Officer*  *Commissioner of Patents and Trademarks*